US008266141B2

(12) United States Patent
Radlinski et al.

(10) Patent No.: US 8,266,141 B2
(45) Date of Patent: Sep. 11, 2012

(54) EFFICIENT USE OF COMPUTATIONAL RESOURCES FOR INTERLEAVING

(75) Inventors: Filip Radlinski, Vancouver (CA); Nick Craswell, Seattle, WA (US); Peter Bailey, Kirkland, WA (US); Daniel Schwartz, Seattle, WA (US); Aidan Crook, Bellevue, WA (US); Likhita Krishnamurthy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 12/964,346

(22) Filed: Dec. 9, 2010

(65) Prior Publication Data
US 2012/0150847 A1 Jun. 14, 2012

(51) Int. Cl.
*G06F 17/30* (2006.01)
(52) U.S. Cl. .................... 707/723; 707/748
(58) Field of Classification Search ............... 707/723, 707/748
See application file for complete search history.

(56) References Cited

U.S. PATENT DOCUMENTS

| 7,424,469 | B2 | 9/2008 | Ratnaparkhi | |
|---|---|---|---|---|
| 7,574,436 | B2 | 8/2009 | Kapur et al. | |
| 2006/0184514 | A1 | 8/2006 | Meng et al. | |
| 2008/0319944 | A1 | 12/2008 | Venolia et al. | |
| 2009/0019030 | A1 | 1/2009 | Smolyanskiy | |
| 2010/0235351 | A1* | 9/2010 | Iwasa et al. | 707/723 |
| 2011/0093456 | A1* | 4/2011 | Ryan et al. | 707/723 |
| 2011/0258182 | A1* | 10/2011 | Singh et al. | 707/723 |
| 2011/0320441 | A1* | 12/2011 | Lee et al. | 707/723 |
| 2012/0089601 | A1* | 4/2012 | Bailey et al. | 707/723 |

OTHER PUBLICATIONS

Furu Wei, et al., iRANK: A Rank-Learn-Combine Framework for—Published Date: Dec. 7, 2009 http://research.microsoft.com/en-us/um/people/shliu/jasist-irank-final.pdf.
Leonidas Akritidis, et al., QuadSearch: A Novel Metasearch Engine—Published Date: May 2007 http://delab.csd.auth.gr/papers/PCI07avkb.pdf.
Yisong Yue, et al., Self-Improving Systems that Learn Through Human Interaction—Published Date: Oct. 15, 2009 http://www.science20.com/stated_degree_confidence/blog/selfimproving_systems_learn_through_human_interaction.
Greg Linden, Testing rankers by interleaving search results—Published Date: Nov. 11, 2008 http://glinden.blogspot.com/2008/11/testing-rankers-by-interleaving-search.html.
B. Uygar Oztekin, et al., Expert Agreement and Content Based Reranking in a Meta Search Environment using Mearf—Published Date: May 11, 2002 http://www2002.org/CDROM/refereed/520/.

* cited by examiner

*Primary Examiner* — Pierre Vital
*Assistant Examiner* — Sabana Rahman
(74) *Attorney, Agent, or Firm* — Shook Hardy & Bacon LLP

(57) ABSTRACT

Methods and computer-readable media are provided for improving the efficiency of the interleaving process. Once it is determined that a search query is to be used in an interleaving experiment, a primary ranking system and a secondary ranking system are analyzed to determine whether their respective search results for that search query would be identical. If the search results would be identical, the search query is routed only to the primary ranking system and not the secondary ranking system. If, however, it is determined that the search results would not be identical, both the primary ranking system and the secondary ranking system receive the search query for processing.

15 Claims, 6 Drawing Sheets

EFFICIENT USE OF COMPUTATIONAL RESOURCES FOR INTERLEAVING

BACKGROUND

The amount of information and content available on the Internet continues to grow exponentially. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

In finding relevant web pages, multiple ranking systems may be used. It may, however, be difficult to determine which ranking system is providing the most useful results to users. Many methods that aim to make this determination based on search engine user behavior utilize a large amount of network resources and create a large load on the various search and ranking systems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to efficient methods of interleaving multiple ranking systems. A portion of search queries received in a search engine may be used in interleaving experiments, which assist in determining which ranking or search system produces the search results that are more popular with users. This may be determined by the number of clicks on each search result and mapping the particular search result to the ranking system that produce that search result. According to embodiments of the present invention, interleaving systems are utilized in a more efficient manner, which eliminates the use of unnecessary network resources. The system is made more efficient by short circuiting the secondary ranking system when it is determined that it will produce identical search results to the search results of the primary ranking system. Further, only those components of the secondary ranking system that might produce different outputs than their counterpart components in the primary ranking system are invoked twice, while outputs of the primary ranking system are reused in the secondary ranking system when it can be determined that an invocation of those components by the secondary ranking system would have produced the same results. Even further, interleaving is performed only when necessary, such as when the search results are not identical, or when a predetermined quantity of search results from both the primary and secondary ranking systems are not the same.

BRIEF DESCRIPTION OF THE DRAWINGS

The present invention is described in detail below with reference to the attached drawing figures, wherein.

DETAILED DESCRIPTION

Figure 1:
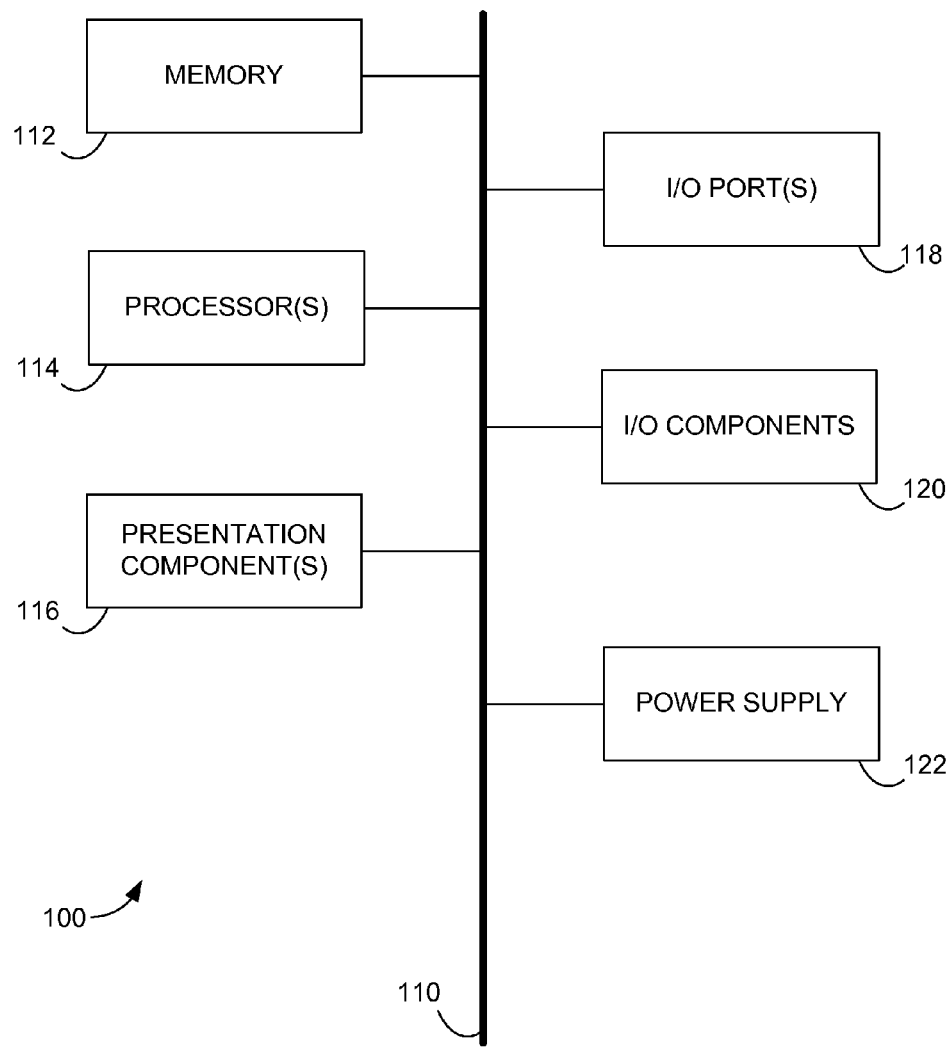
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide for efficiently performing interleaving experiments using multiple ranking or search systems. Interleaving is the process of combining multiple sets of search results and using, for instance, clicks on the search results to determine which ranking system is providing the search results preferred by users. To make the process of interleaving more efficient, it may be determined, either prior to or subsequent to the processing of a search query, whether the search results produced by multiple ranking systems will be identical or at least have a predetermined quantity of common search results. Assuming there is a primary ranking system and a secondary ranking system involved in an interleaving experiment, if it is found that the search results will be identical, the secondary ranking system does not process the search query such that only the search results from the primary ranking system are produced and presented to the user. Further, after both ranking systems process the search query, it may be determined that the search results are identical. Instead of interleaving the search results automatically, the fact that they are identical can be determined prior to interleaving the search results such that interleaving does not occur, thus eliminating the use of unnecessary network resources. Even further, in one embodiment, the search query may be routed to the secondary ranking system, but only to those components that are directly involved with providing a search results page.

Accordingly, in one aspect, an embodiment of the present invention is directed to one or more computer-readable media storing computer-useable instructions that, when used by a computing device, cause the computing device to perform a method for facilitating an efficient interleaving process. The method includes receiving a search query and determining that the search query is to be used in an interleaving experiment, the interleaving experiment using a primary ranking system and a secondary ranking system. Further, the method includes, based on the search query, analyzing the primary ranking system and the secondary ranking system to determine, prior to routing the search query to either ranking system, whether search results produced by the primary ranking system and the secondary ranking system will be identical. If it is determined that the search results will be identical, the method routes the search query only to the primary ranking system. But, if it is determined that the search results will not be identical, the method routes the search query to both the primary ranking system and the secondary ranking system.

In another embodiment, an aspect of the invention is directed to one or more computer-readable media storing computer-useable instructions that, when used by a computing device, cause the computing device to perform a method for facilitating an efficient interleaving process. The method includes receiving a search query and determining that the search query is involved in an interleaving experiment that uses a primary ranking system and a secondary ranking system. The method further routes the search query to the primary ranking system and the secondary ranking system. The secondary ranking system has additional logic incorporated therein so that it is aware that it is being used in the interleaving experiment. At the secondary ranking system during processing of the search query, it is determined that the search results of the secondary ranking system will be identical to the search results of the primary ranking system. The method also includes discontinuing the processing of the search query in the secondary ranking system.

A further embodiment of the invention is directed to one or more computer-readable media storing computer-useable instructions that, when used by a computing device, cause the computing device to perform a method for facilitating an efficient interleaving process. The method includes determining that a search query is involved in an interleaving experiment and duplicating the search query such that the search query can be sent to a primary ranking system and a secondary ranking system. Further, the method includes identifying one or more ranking components associated with the secondary ranking system that are used to produce a ranked list of search results and routing the search query through each standard component of the primary ranking system. Additionally, the method includes routing the duplicate search query only through the one or more ranking components identified in the secondary ranking system.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media implemented in any method or technology for storage of information such as computer-readable instructions, computer-storage media, data structures, program modules, or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above are also included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
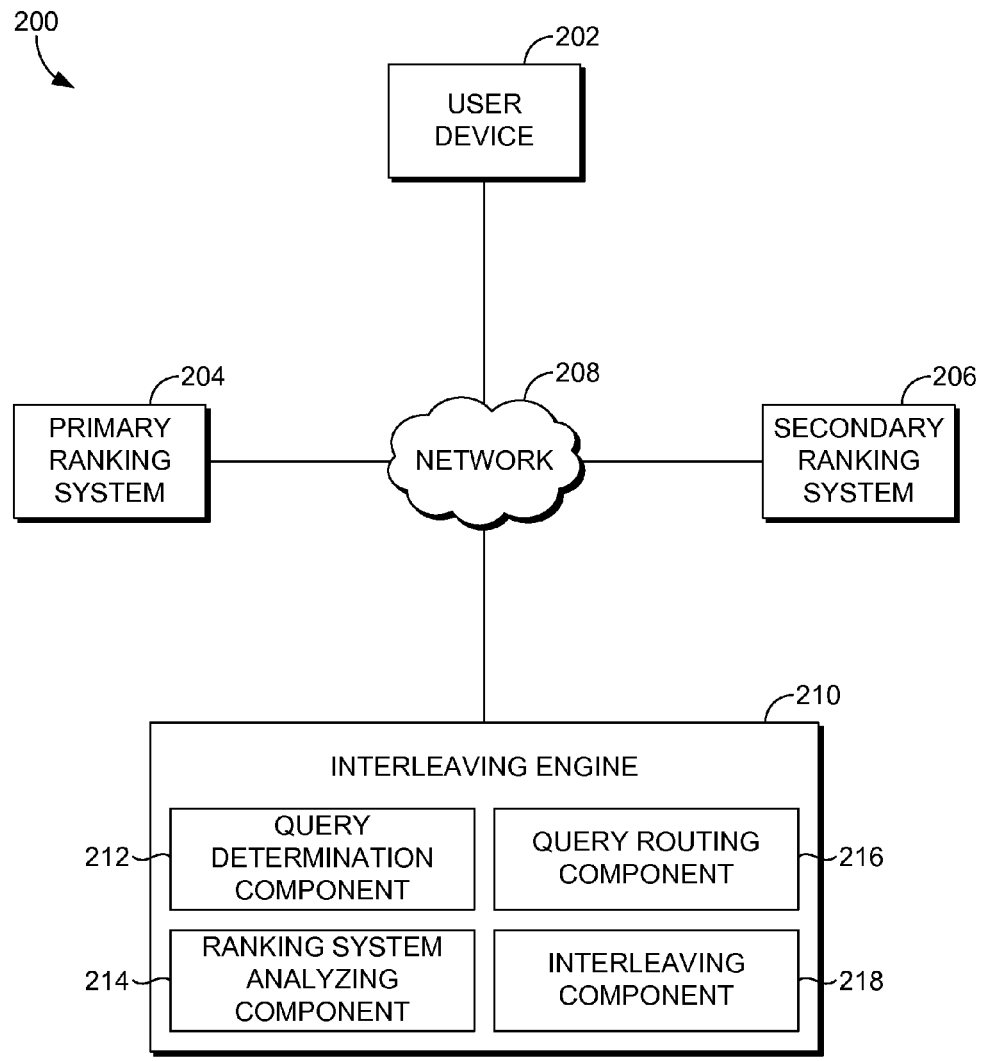
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

For instance, various functions may be carried out by a processor executing instructions stored in memory.

Among other components not shown, the system 200 includes a user device 202, a primary ranking system 204, a secondary ranking system 206, and an interleaving engine 210. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, ranking systems, and interleaving engines may be employed within the system 200 within the scope of the present invention. Each may comprise a single device or multiple devices cooperating in a distributed environment. For instance, the ranking server 206 may comprise multiple devices arranged in a distributed environment that collectively provide the functionality of the ranking server 206 described herein. Additionally, other components not shown may also be included within the system 200, while components shown in FIG. 2 may be omitted in some embodiments.

The user device 202 may be any type of computing device owned and/or operated by an end user that can access network 208. For instance, the user device 202 may be a desktop computer, a laptop computer, a tablet computer, a mobile device, or any other device having network access. Generally, an end user may employ the user device 202 to, among other things, access electronic documents maintained by the system. For instance, the end user may employ a web browser on the user device 202 to access and view electronic documents that are ranked by one or more of the primary ranking system 204 or the secondary ranking system 206. Prior to being presented to the user via the user device 202, the search results may be interleaved, such as when both the primary ranking system 204 and the secondary ranking system 206 provide search results.

As mentioned, multiple ranking systems may be involved in an interleaving experiment. When evaluating search ranking systems, it may be beneficial to measure how users respond to search results to determine if one ranking system is better than another. Typically, the number of clicks or selections of search results is used to make this determination, as it is the most easily accessible signal as to whether users are satisfied with the returned search results. Interleaving, however, can be used for interpreting these clicks on search results, as it is an efficient and sensitive technique for accomplishing the same results. As such, in one embodiment, given two ranked sets of results, the process of interleaving combines the two sets of results by interspersing (e.g., interleaving) the results, while also removing duplicates. This combined list is then presented to the user. When a user clicks on a search results to select that search result, the click can be mapped back to the two individual lists of search results that contributed to the combined list. In this way, the input ranking that contributed to more of the useful search results gets credit more often than the other input ranking and "wins" the interleaving test. Interleaving may be performed on a small number of submitted search queries, or in some cases, on a large number of search queries relative to the total quantity of search queries received in a particular search engine.

There are various algorithms used for interleaving. One of these algorithms is the Team Draft algorithm. This algorithm is described herein for exemplary purposes only and is not meant to limit the embodiments of the present invention. The Team Draft algorithm involves taking multiple input rankings, such as two input rankings. These are termed Ranker A and Ranker B, each having search results in a particular order based on a particular query. The algorithm repeatedly: (1) flips an unbiased coin to determine if Ranker A goes first or Ranker B goes first; (2) the winning ranking chooses its highest ranked result that is not in the combined interleaved list and adds it to the end of the combined interleaved list; (3) the other ranking then chooses its highest ranked result that is not in the combined interleaved list and adds it to the end of the combined interleaved list; (4) when the combined interleaved list is long enough (e.g., when the desired number of search results have been identified), this list of results is presented to the user who submitted the search query; and (5) if the user clicks on any of the search results, these clicks or selections are mapped back to the input Ranker A or Ranker B that contributed the clicked or selected search results. If one of the input ranking systems gets credit for more clicked or selected results than the other, then that ranking system would win the interleaving impression or experiment. By aggregating over all search queries entered by users, it can be determined whether Ranker A or Ranker B is producing the search results preferred by the users. This tells us which ranking system is better on average.

Returning to FIG. 2, the primary ranking system 204 may be any type of a search system that is capable of taking an input search query and returning relevant search results based on the query. In embodiments of the present invention, the primary ranking system 204 is the ranking system that usually functions as normal such that it is always sent the search query for processing in the context of an interleaving experiment. The secondary ranking system 206, however, may or may not be sent the search query during an interleaving experiment, depending on the embodiment of the present invention. For instance, even though two or more ranking systems are typically used in an interleaving experiment, in embodiments described herein, the primary ranking system 204 may be sent the search query for processing but the secondary ranking system 206 may not. In this case, it may have been determined prior to processing but after the search query is received that the secondary ranking system 206 will likely not produce different search results than the primary ranking system 204. Allowing the secondary ranking system 206 to process the query if the search results are likely to be identical to the search results returned by the primary ranking system 204 is a waste of network resources.

For example, Ranker A may be the current production web search ranking system and Ranker B may be the current production web search ranking system but with one parameter changed. In this case, Ranker B or another system component may be able to detect if this changed parameter will make a difference in the ranking without needing to perform the full computation necessary to produce a full set of search results. This may be known either before the query is even sent to the secondary ranking system 206, or at some point during processing of the search query by the second processing system 206, as described in more detail below.

In another example, Ranker B may be very similar to Ranker A, but adds more recently-created web documents to search results when the query relates to a current event. In this case, Ranker B can first determine whether the search query relates to a current event. If it does not, Ranker B would otherwise produce exactly the same results as Ranker A. If Ranker B knows that it is a secondary ranking system, however, it can return empty results immediately after determining whether the query relates to a current event. Performing this check is much less computationally expensive and time consuming than producing a complete set of search results in response to the search query.

In alternative embodiments, as briefly mentioned above, the secondary ranking system 206 may include additional logic so that it knows that it is the secondary ranking system and not the primary ranking system. As such, in some embodiments, the search query may be routed to both ranking systems, but the secondary ranking system 206, part of the way through its processing of the search query, may determine that it will produce identical search results to those of the primary ranking system 204. Here, the secondary ranking system 206 knows, because of the logic therein, that it will produce the same results as the primary ranking system 204 and discontinue processing of the search query. Search systems typically are not able to discontinue processing of a query before retrieving search results. In the case of interleaving, however, two or more ranking systems may be tasked with producing search results. If a second ranking system, such as Ranker B, exits early without returning any search results, the search results from a first ranking system, or Ranker A, can be presented to the user. Avoiding unnecessary computation in the case where Ranker B would otherwise return identical results as Ranking A can save computational effort, thus reducing the need for extra back-end hardware that would otherwise be necessary.

In yet another embodiment, the primary ranking system 204 and the secondary ranking system 206 may both produce individual sets of search results. But, when the search results are sent to the interleaver, the interleaver may determine that the search results happen to be identical. Alternatively to being identical, a predetermined quantity of search results may be identical. In either case, the interleaver, while it would typically interleave the results anyway, may determine not to interleave the results and simply use the search results from the primary ranking system 204. This saves network resources, in addition to time and money.

In still another embodiment, the search query may be sent to both the primary ranking system 204 and the secondary ranking system 206, but it may not be sent to each of the components that comprise the secondary ranking system 206. A search system, such as a ranking system, is comprised of a large number of components that carry out specialized activities to respond to a user's search query and generate a results page for the user to view. For exemplary purposes only, components that comprise a search system may perform the following functions: process and annotate the search query; query one or more data repositories and rank the individual items that match; produce item captions; amalgamate rankings from different data repositories into a single ordering; produce other types of information related to the search query (e.g., related searches or advertisements); transform the raw information into web browser renderable markup code; and coordinate all of the other components. These are just a few examples of the many functions for which the components may be responsible. To eliminate search system inefficiency when conducting interleaving experiments, embodiments of the present invention provide for routing the search query to only those components associated with the secondary ranking system 206 that are directly involved in producing search results and which may have different output from the corresponding component in the primary ranking system 204, while still sending the search query to the primary ranking system 204 and all of its components to which the search query is normally sent. The outputs of the components of the primary ranking system 204 may be sent as inputs to components of the secondary ranking system 206 so that the work done by the primary ranking system can be leveraged by the secondary ranking system 206.

Ranking or search systems typically include a component that routes a search query through multiple components to produce the final page of information (e.g., results page) to the user. This routing may be considered a workflow. Only a subset of these components are involved in producing the ranked list of documents. A routing component may, for instance, decide that the current search query is to be treated as part of the interleaving experiment's query traffic; duplicate the query (for the primary and secondary ranking systems) and route it to the downstream components for processing, marking one query to be processed by the primary ranking system and the other to be processed by the secondary ranking system; and assemble the final page of information, having interleaved the ranked lists of documents. As explained, typically all components in both ranking systems are employed. The routing component, however, can now be selective. It may send the query through all the standard components of the primary ranking system 204 and send the query through only those components of the secondary ranking system 206 that contribute to the document ranking workflow. Alternatively or in combination, the routing component may send the query to the secondary ranking system 206 but only from the point at which components in the secondary ranking system 206 differ from those in the primary ranking system 204. As early as possible, the document ranking outputs are captured from the primary ranking system 204 and the secondary ranking system 206 and the search results are sent to an interleaving component. The other components of the secondary ranking system 206 that are not involved in producing search results may not be employed at all in the above-described embodiments.

Returning once again to FIG. 2, the interleaving engine 210 comprises four components, including a query determination component 212, a ranking system analyzing component 214, a query routing component 216, and an interleaving component 218. Generally, the query determination component 212 is responsible for determining whether the received search query is involved in an interleaving experiment. If it is, embodiments of the present invention described herein are employed. If not, the search query is treated as it normally would be treated. The ranking system analyzing component 214 determines, prior to routing the query to the ranking systems, whether the search results produced by each of the ranking systems are likely to be identical. If so, the ranking system analyzing component 214 may route the search query only to the primary ranking system 204 but not to the secondary ranking system 206. The ranking system analyzing component 214 may also be responsible for determining that one or more words in the search query are incorrectly spelled. It may correct the spelling of the search query or even determine that a spelling experiment is to be conducted.

The query routing component 216 routes the query to the primary ranking system 204, the secondary ranking system 206, or both. In some instances, the query routing component 216 makes the determination that a query should be routed to the primary ranking system 204, the secondary ranking system 206, or both. The interleaving component 218 is responsible for determining whether interleaving is necessary based on the search results returned by the primary ranking system 204 and the secondary ranking system 206. For instance, if the search results are identical, or if a predetermined quantity of search results are the same (e.g., top ten search results are identical), the interleaving component 218 may determine that interleaving is not necessary and use the search results from the primary ranking component 204 to return to the user.

Figure 3:
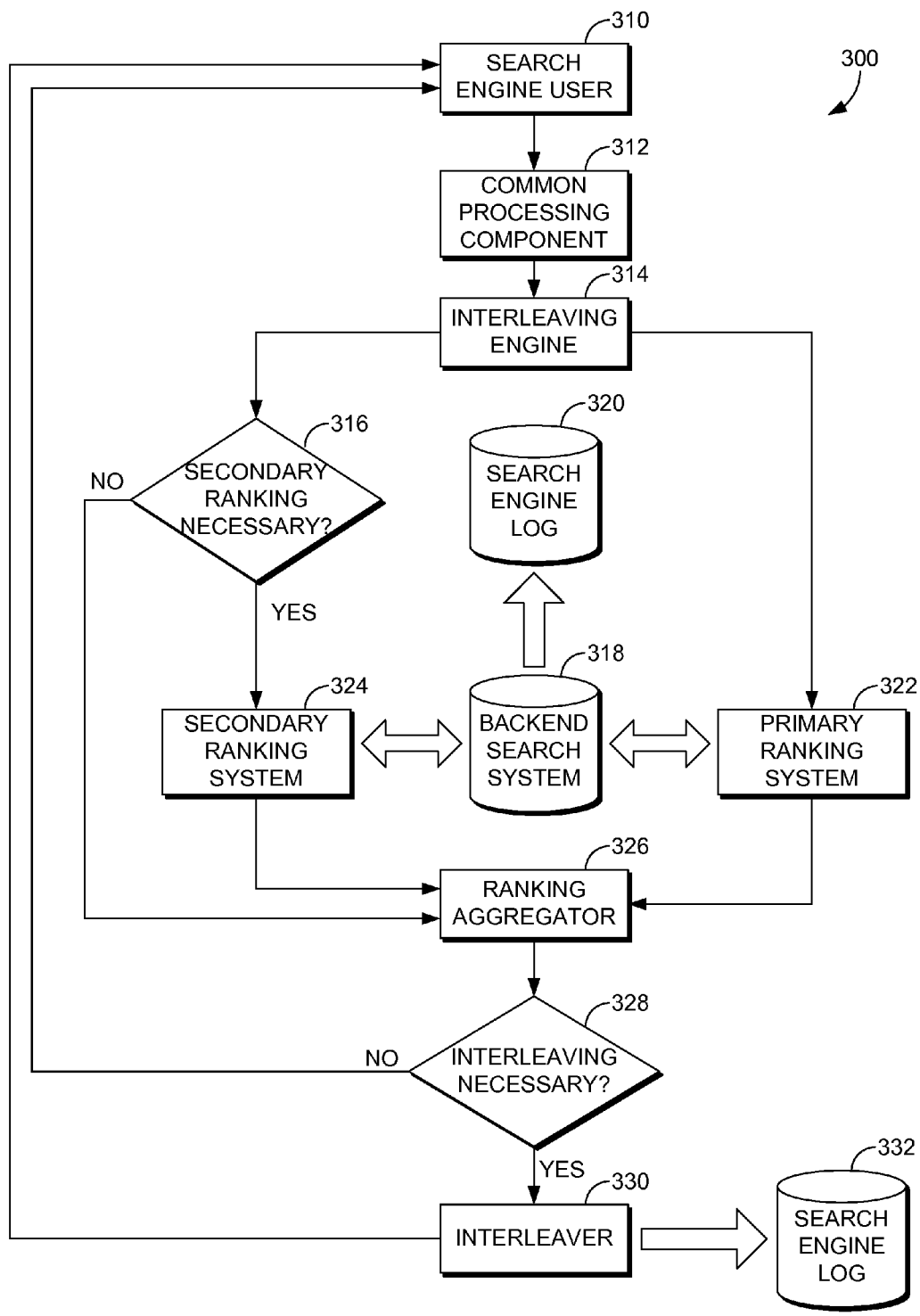
FIG. 3 is another block diagram of an exemplary system in which embodiments of the invention may be employed.

FIG. 3 is a block diagram of an exemplary system 300 in which embodiments of the invention may be employed. Initially, a search engine user 310 submits a search query via a search engine, such as through a user device. A common processing engine 312 is responsible for correcting spelling of one or more words in the search query. This may occur if the interleaving experiment is based on spelling. Generally, the common processing engine 312 is responsible for making any changes to the search query prior to it being routed to the ranking systems. The interleaving engine 314 is generally responsible for all of the preprocess work prior to interleaving. For instance, the interleaving engine 314 may duplicate the query so that it can be routed to both the primary and secondary ranking systems. In one embodiment, the interleaving engine 314 analyzes the primary and secondary ranking systems and determines which parameters are different. Based on this, the interleaving engine 314 can determine whether the search results produced by each will be identical. Shown at step 316, it is determined whether it is necessary to route the search query to the secondary ranking system 324. In one instance, it is not necessary to route the search query to the secondary ranking system 324 if, prior to processing the search query, it is determined that the search results of the secondary ranking system 324 and the primary ranking system 322 would be identical.

Even further, the interleaving engine 314 may determine the components associated with the secondary ranking system to which the search query should be routed. As described above, embodiments of the present invention allow for the search query to be routed to only those components in a ranking system that are directly involved with producing search results. This eliminates the use of unnecessary network resources.

The interleaving engine 314 may route the search query to the primary ranking system 322, the secondary ranking system 324, or both, depending on the outcome of the interleaving engine's 314 analysis of the ranking system. As mentioned, it is determined at step 316 whether the search query is to be routed to the secondary ranking system 324. If it is found to be necessary, the search query is routed to the secondary ranking system 324. If not, empty results are produced (e.g., no search results) so that the other components in the overall process shown in FIG. 3 know that the secondary ranking system 324 will not be producing any results to be used in the interleaving experiment. In one embodiment, the secondary ranking system 324 has additional logic thereon that allows it to determine, during processing of a search query, whether it will be producing identical results to those produced by the primary ranking system 322. If it makes this determination, it also produces empty results and discontinues the processing of the search query immediately. In another embodiment, the query routing system is able to determine that a given component will produce the same outputs in both the primary and secondary ranking system, and thus it can reuse the output from the primary ranking system component in the secondary ranking system workflow. The backend search system 318 and the search engine log 320 are used by both the primary ranking system 322 and the secondary ranking system 324 in processing the search query and providing search results.

Each time a search query is received, the primary ranking system 322 processes the search query to produce a set of search results. These search results are routed to the ranking aggregator 326. If the secondary ranking system 324 is utilized, it also sends a set of search results to the ranking aggregator 326. In the instance where the secondary ranking system 324 determines that its search results would be identical to those of the primary ranking system 322, the search results sent to the ranking aggregator 326 are empty, meaning that there are no search results returned. The empty results may provide an indication to the ranking aggregator 326 that it has not produced any search results. In one embodiment, the primary ranking system 322 always produces search results so that at least those search results, whether interleaved or not, can be presented to the user, even when the secondary ranking system 324 does not produce search results. Once the search results are aggregated at the ranking aggregator 326, it is determined whether interleaving is necessary at step 328 given the returned sets of search results by the two ranking systems. In one instance, interleaving is not necessary and not performed because the secondary ranking system 324 returned an empty set of results. In another instance, interleaving is not necessary and not performed because the two sets of search results are identical, or at least some of the search results are identical. How many search results have to be identical to not perform interleaving is implementation specific and can be modified. If it is determined at step 328 that interleaving is not necessary, the set of search results provided by the primary ranking system 322 is returned to the search engine user 310. But, if interleaving is determined to be necessary, the interleaver 330 interleaves the multiple sets of search results using any available interleaving algorithm, such as the Team Draft algorithm described herein. Various data related to the search results is stored in the search engine log 332, and the interleaved set of search results is communicated to the search engine user 310.

Figure 4:
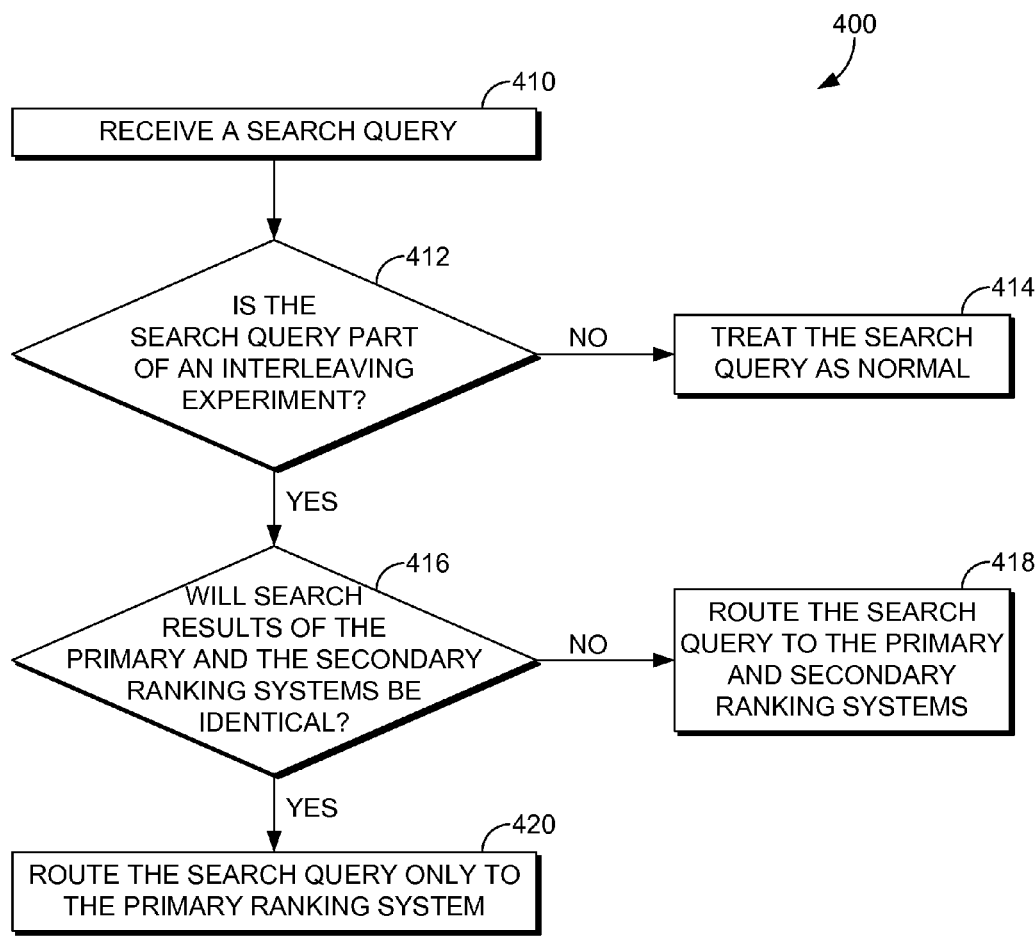
FIGS. 4-6 are flow diagrams showing methods for facilitating an efficient interleaving process, in accordance with embodiments of the present invention.

Turning now to FIG. 4, a flow diagram showing a method 400 for facilitating an efficient interleaving process is illustrated, in accordance with an embodiment of the present invention. Initially, a search query is received at step 410. At step 412, it is determined whether the search query is part of an interleaving experiment. An interleaving experiment, as used herein, is an experiment that compares search results produced by two or more ranking systems and ultimately determines which of the two or more ranking systems provide the search results that are more often selected by users. In one instance, the interleaving experiment uses a primary ranking system and a secondary ranking system. While two ranking systems are described here, more than two may also be used and are contemplated to be within the scope of the present invention. If the search query is not a part of an interleaving experiment, the search query is treated as it would normally be treated, shown at step 414.

If the search query is a part of an interleaving experiment, it is then determined at step 416 whether the search results of the primary and the secondary ranking systems will be identical. This is determined, in one embodiment, by analyzing the ranking systems to determine the differences. In one instance, if a single parameter is the only difference between two ranking systems, and it can be determined with a high degree of confidence that the different parameter will not have an effect on the production of search results for a particular query, it may be determined that the search results will be identical. In one embodiment, analyzing the ranking systems is performed prior to routing the search query to either ranking system. If it is not determined at step 416 that the search results will be identical, the search query is routed to the primary and secondary ranking systems at step 418 so that two sets of search results are produced and interleaved prior to being presented to the user. As such, a single set of search results is returned to the user but is based on two or more individual sets of search results that have been interleaved. In one embodiment, the secondary ranking system is aware that it is being used as the secondary ranking system and may include additional logic that allows it to discontinue processing a search query if it determines at any time that its search results may be identical to those of the primary ranking system.

At step 420, if it was previously determined that the search results will be identical, the search query is routed only to the primary ranking system, whose search results are used to present to the user. While it is mentioned that the search results may be identical, in some embodiments, all of the search results may not be identical, but a predetermined quantity of search results (e.g., such as the top ten results) may be identical or may be common to both sets of search results. As a result, the secondary ranking system may not be employed to provide search results.

In one embodiment, when the search query is routed to both the primary and secondary ranking systems, the resulting sets of search results are communicated to an interleaving component. The interleaving component, prior to interleaving the search results, may determine whether the search results are identical, or at least whether there are more than a predetermined quantity of the same search results. If the search results are identical, the primary set of search results associated with the primary ranking system is returned to the user. But, if the search results are not identical, the primary and secondary sets of search results are interleaved such that the interleaved set of search results is returned and presented to the user.

Figure 5:
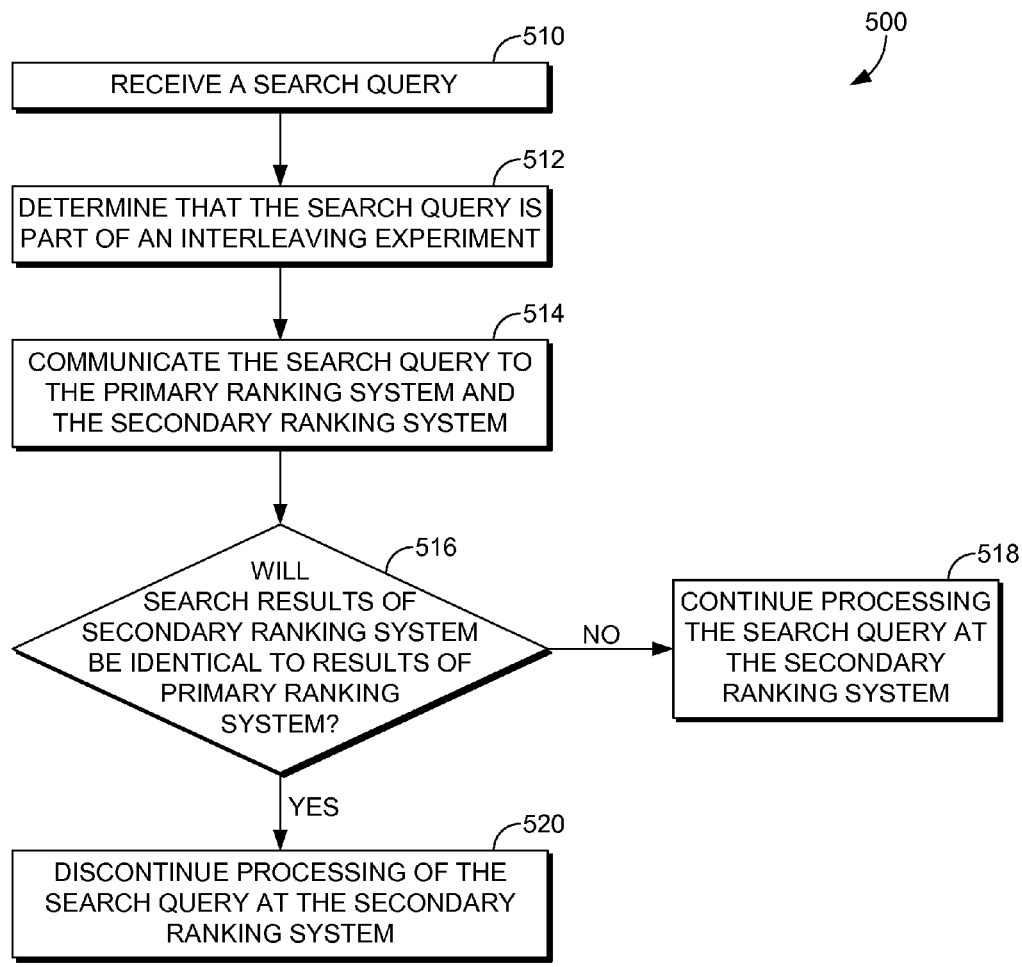

Referring to FIG. 5, a flow diagram is shown of a method 500 for facilitating an efficient interleaving process, in accordance with an embodiment of the present invention. A search query is received at 510, and it is determined that the search query is part of an interleaving experiment, shown at step 512. The search query is routed to both the primary ranking system and the secondary ranking system at step 514. In embodiments, the secondary ranking system has logic thereon that makes it aware that it is being used in an interleaving experiment. It is determined at step 516 whether the search results of the secondary ranking system will be identical to the search results of the primary ranking system. This determination step, in one embodiment, takes place after the processing of the search query has begun by the secondary ranking system. The secondary ranking system may know to make this determination because of the additional logic thereon.

If it is not determined that the search results will be identical, the secondary ranking system continues processing the search query, shown at step 518. If, however, it is determined that the results will be identical or that a subset of the results will be identical, processing of the search query is discontinued at the secondary ranking system, shown at step 520. Here, the secondary ranking system would produce empty results, and as such does not return search results to an interleaving component. Even though the secondary ranking system discontinues its processing of the search query, the primary ranking system may continue its processing of the search query so that a set of search results can be presented to the user.

Figure 6:
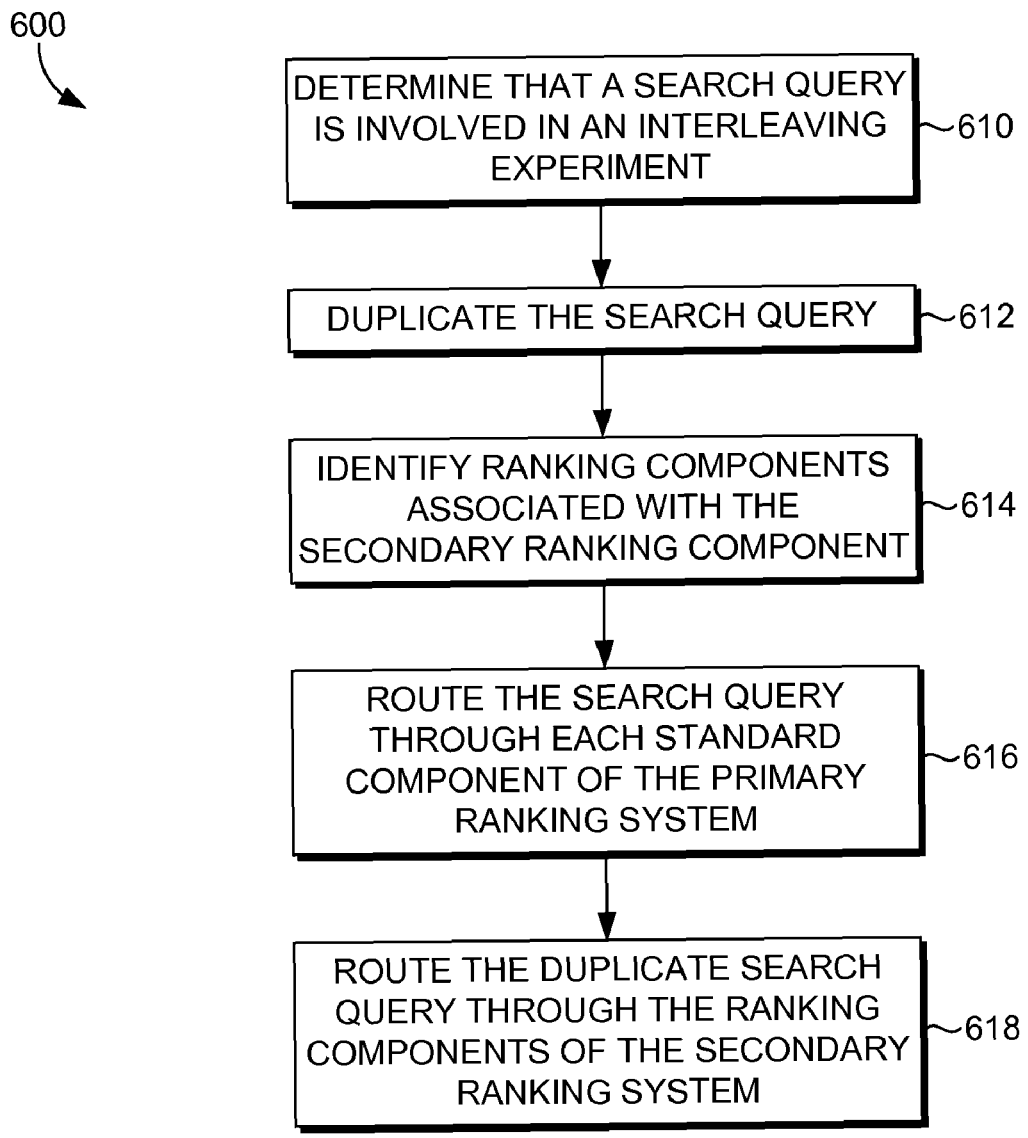

FIG. 6 is a flow diagram showing a method 600 for facilitating an efficient interleaving process, in accordance with an embodiment of the present invention. Initially, at step 610, it is determined that a search query is involved in an interleaving experiment. At step 612, the search query is duplicated so that it can be sent to both a primary ranking system and a secondary ranking system that are both used in the interleaving experiment. Ranking components that are associated with the secondary ranking component, and in particular those that are used to produce a ranked list of search results, are identified at step 614. The search query is routed through each standard component of the primary ranking system at step 616. At step 618, however, the search query is routed through only those components associated with the secondary ranking system that are directly involved in ranking search results and providing a ranked list of search results. In one embodiment, the duplicate search query is routed to the secondary ranking system only from the point at which the components differ from those in the primary ranking system. Here, it can be expected that identical results will be produced up to the point where the components differ. Once the search query is routed to both ranking systems, it may be determined whether the produced search results are identical. If so, an interleaving algorithm that interleaves the search results is not run. But, if the results are not identical, the interleaving algorithm is run such that the search results are interleaved prior to being presented to the user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media storing computer-useable instructions that, when used by a computing device, cause the computing device to perform a method for facilitating an efficient interleaving process, the method comprising:

receiving a search query;

determining that the search query is to be used in an interleaving experiment, the interleaving experiment using a primary ranking system and a secondary ranking system;

based on the search query, analyzing the primary ranking system and the secondary ranking system to determine, prior to routing the search query to either ranking system, whether search results produced by the primary ranking system and the secondary ranking system will be identical, wherein analyzing the primary ranking system and the secondary ranking system further comprises, identifying one or more parameters used to rank documents that are different between the primary ranking system and the secondary ranking system, and determining whether the search query is associated with any of the one or more parameters such that, (1) if the search query is associated with any of the one or more parameters, determining that the search results would not be identical, and (2) if the search query is not associated with any of the one or more parameters, determining that the search results would be identical;

if it is determined that the search results will be identical, routing the search query only to the primary ranking system; and if it is determined that the search results will not be identical, routing the search query to both the primary ranking system and the secondary ranking system and interleaving the search results from the primary ranking system and the secondary ranking system to generate a single set of search results to return to a user based on the search query.

2. The computer-readable media of claim 1, wherein the interleaving experiment compares the search results produced by the primary ranking system and the secondary ranking system and determines which produces more relevant search results.

3. The computer-readable media of claim 2, wherein determining which produces more relevant search results is based on associating the search results that are selected more often to the primary ranking system or the secondary ranking system.

4. The computer-readable media of claim 1, wherein if it is determined that the search results would be identical, further comprising returning the search results produced by the primary ranking system to a user based on the search query.

5. The computer-readable media of claim 1, further comprising communicating to the secondary ranking system that it is being used in the interleaving experiment.

6. The computer-readable media of claim 5, further comprising during processing of the search query by the secondary ranking system but prior to completion of the search results, determining at the secondary ranking system that the search results will be identical to the search results of the primary ranking system.

7. The computer-readable media of claim 6, further comprising discontinuing the processing of the search query in the secondary ranking system and providing a user the search results of the primary ranking system.

8. The computer-readable media of claim 1, further comprising:
  receiving, at an interleaving component, a primary set of search results and a secondary set of search results;
  determining whether the primary and the secondary sets of search results are identical;
  if the primary and the secondary sets of search results are identical, returning the primary set of search results to a user based on the search query; and
  if the primary and the secondary sets of search results are not identical,
    (1) interleaving the primary set of search results with the secondary set of search results, and
    (2) returning an interleaved set of search results to the user.

9. One or more computer-readable media storing computer-useable instructions that, when used by a computing device, cause the computing device to perform a method for facilitating an efficient interleaving process, the method comprising:
  receiving a search query;
  determining that the search query is involved in an interleaving experiment that uses a primary ranking system and a secondary ranking system;
  routing the search query to the primary ranking system and the secondary ranking system, wherein the secondary ranking system has additional logic incorporated therein so that it is aware that it is being used in the interleaving experiment;
  communicating to the secondary ranking system that it is being used in the interleaving experiment so that it knows to discontinue the processing of the search query if it determines that the search results will be identical to the search results of the primary ranking system;
  at the secondary ranking system during processing of the search query, determining that the search results of the secondary ranking system will be identical to the search results of the primary ranking system, wherein the determining further comprises,
    identifying one or more parameters used to rank documents that are different between the primary ranking system and the secondary ranking system, and
    determining that the search query is not associated with any of the one or more parameters; and
  discontinuing the processing of the search query in the secondary ranking system.

10. The computer-readable media of claim 9, further comprising continuing the processing of the search query in the primary ranking system.

11. The computer-readable media of claim 9, further comprising providing the search results from the primary ranking system to a user based on the search query.

12. The computer-readable media of claim 9, wherein the secondary ranking system does not return search results to an interleaving component.

13. One or more computer-readable media storing computer-useable instructions that, when used by a computing device, cause the computing device to perform a method for facilitating an efficient interleaving process, the method comprising:
  determining that a search query is involved in an interleaving experiment;
  duplicating the search query such that the search query can be sent to a primary ranking system and a secondary ranking system;
  identifying one or more ranking components associated with the secondary ranking system that are used to produce a ranked list of search results;
  routing the search query through each standard component of the primary ranking system;
  routing the duplicate search query only through the one or more ranking components identified in the secondary ranking system; and
  prior to interleaving the search results from the primary ranking system and the secondary ranking system, determining whether primary search results associated with the primary ranking system and secondary search results associated with the secondary ranking system are identical such that,
    (1) if the primary search results are identical to the secondary search results, not running an interleaving algorithm that interleaves the search results, and
    (2) if the primary search results are not identical to the secondary search results, running the interleaving algorithm that interleaves the search results.

14. The one or more computer-readable media of claim 13, wherein the duplicate search query is routed to the secondary ranking system from the point at which components differ from those in the primary ranking system.

15. The one or more computer-readable media of claim 13, wherein the primary search results are identical to the secondary search results if a predetermined quantity of the search results are identical.

* * * * *